US006683937B1

United States Patent
Watson et al.

(10) Patent No.: US 6,683,937 B1
(45) Date of Patent: *Jan. 27, 2004

(54) CALL CENTER FOR HANDLING VIDEO CALLS FROM THE HEARING IMPAIRED

(75) Inventors: Thomas Michael Watson, Raymore, MO (US); Paul W. Ludwick, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/232,546

(22) Filed: Aug. 29, 2002

Related U.S. Application Data

(63) Continuation of application No. 09/699,841, filed on Oct. 30, 2000.

(51) Int. Cl.$^7$ .............................................. H04M 11/00
(52) U.S. Cl. .................... 379/52; 379/265.09
(58) Field of Search ............................ 379/52, 93.08, 379/93.14, 93.17, 211.01, 211.02, 221.01, 265.01, 265.02, 265.03, 265.09, 265.13, 266.01, 266.02

(56) References Cited

U.S. PATENT DOCUMENTS

| | | | |
|---|---|---|---|
| 5,533,108 A | * | 7/1996 | Harris et al. .............. 348/14.01 |
| 5,787,148 A | | 7/1998 | August |
| 5,926,539 A | | 7/1999 | Shtivelman |
| 6,046,762 A | | 4/2000 | Sonesh et al. |

FOREIGN PATENT DOCUMENTS

| | | |
|---|---|---|
| EP | 0821510 A2 | 1/1998 |
| EP | 0848552 A1 | 6/1998 |
| WO | WO 99/14951 | 3/1999 |

OTHER PUBLICATIONS

Fisher, James, "Sprint Announces New Service for Deaf in Texas" Sep. 6, 1996, Kansas City, MO, http://144.226.116.29/PR/CDA/PR_CDA_Press_Releases_Detail_PF/0,1586,1460,00.htm.

Luxner, Larry, "VRI adds visual dimension for the hearing–impaired," Telephony XP–002222502, Aug. 12, 1996, Primedia Business Magazines & Media, Inc.

Hadley, Terry, "Texas Launches Video Relay Service Deaf & Hard–of–Hearing Benefit from Improved Communications," News Releases Public Utility commission of Texas, XP–002222503, Austin, TX, Sep. 1, 2000.

* cited by examiner

*Primary Examiner*—Wing Fu Chan

(57) ABSTRACT

A call center for handling calls for speech and hearing impaired subscribers. The call center includes a plurality of terminals connected to a switching system to handle calls. Each of said plurality of terminals includes a computer system that handles video calls from the speech and hearing impaired subscribers and a telephone station that handles voice calls to parties communicating with the speech and hearing impaired subscribers. A call controller connected to the switching system and the plurality of terminals determines which of the plurality of terminals handles an incoming call.

23 Claims, 9 Drawing Sheets

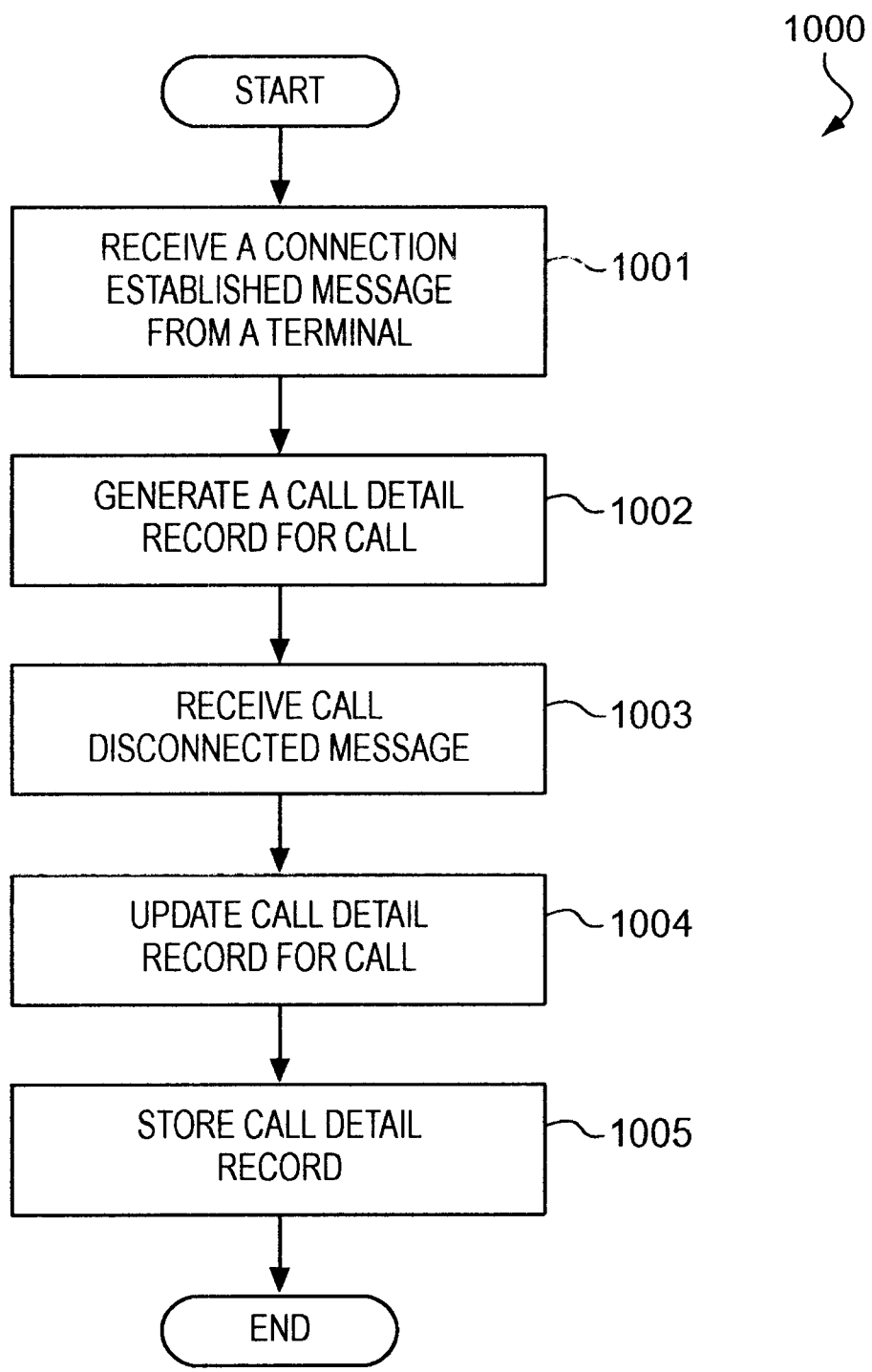

CALL CENTER FOR HANDLING VIDEO CALLS FROM THE HEARING IMPAIRED

RELATED APPLICATIONS

This application is a continuation of prior application Ser. No. 09/699,841, entitled "A Call Center for Handling Video Calls From the Hearing Impaired," filed Oct. 30, 2000, which is hereby incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the provision of telecommunication services to the deaf and hearing impaired. More particularly, the invention is related to providing functionally equivalent services to the speech and hearing impaired. Still more particularly, this invention is related to providing a call center which allows the impaired to use sign language to speak to an interpreter that then translates the sign language to a voice call.

2. Description of the Prior Art

Title IV of the Americans with Disabilities Act of 1990 requires the Federal Communications Commission (FCC) to ensure that telecommunication services are provided to the hearing and speech impaired. Telecommunication Relay Services (TRS) are used to provide the functional equivalent of telecommunication services to the hearing and speech impaired. TRS have been available on a nationwide basis since 1983.

TRS operates in the following manner. A calling party for this system is a speech or hearing impaired person. The calling party has a TDD/TTY, which is a device for transmitting and receiving typed messages. The calling party places a call by dialing a local toll free number. The call is extended to a communication assistant. The call is a modem connection between the calling party and the communication assistant. The calling party then types a telephone number that the calling party wishes to call. A call is then placed by the communication assistant to the telephone number. When a call is established with a party at the desired telephone number, the calling assistant relays the call between the calling party and the called party. The calling party types in messages which are read by the calling assistant to the called party. The called party speaks to the calling assistant, who types in the called party's message. This operation is performed in an opposite manner when a person is calling a hearing or speech impaired person.

It is a problem that type written messages are not the "functional equivalent" of telecommunications for hearing people. Most of the speech and hearing impaired use sign language to communicate and English is a second language to the speech and hearing impaired. Communication using typed out messages is difficult for the speech and hearing impaired. Therefore, a system is needed that allows the speech and hearing impaired to communicate via a telephone connection using sign language.

SUMMARY OF THE INVENTION

The above and other problems are solved and an advance in the art is made by a call center of this invention. A first advantage of the call center of this invention is that hearing and speech impaired subscribers are able to communicate via a telephone using sign language. This provides the hearing and speech impaired with an improved "functionally equivalent_" form of telephone communication. A second advantage of this invention is that remote interpreting of sign language can be performed.

A call center providing the above advantages is made of the following components. The call center has multiple terminals for handling calls connected to a switching system. Each of the terminals includes a computer system connected to the switching system and a telephone station connected to the switching system. The computer system is capable of handling video calls. The telephone station is a conventional voice telephone set. An operator that can interpret sign language operates the terminal.

The computer system at each terminal is connected to a call controller via a network. The call controller is also communicatively connected to the switching system. The call controller determines which terminal handles each incoming call. In order to determine which terminal handles each call, the call controller maintains a database of terminals.

The call center of this invention uses the following method to handle calls to provide sign language interpretation to the speech and hearing impaired. First, the switching system receives a call set-up message for an incoming telephone call. The switching system then determines whether the incoming call is for a video call from a speech or hearing impaired subscriber or a voice call from a calling party to a speech or hearing impaired subscriber. If the incoming call is a video call, the switching system transmits a request for the telephone line to the computer system in the terminal that will handle the call. If the incoming call is a voice call, the switching system transmits a request to the call controller for a telephone line connected to the telephone station of the terminal in the terminal that will handle the call.

The call controller receives the request. The next available terminal is selected by the call controller. The call controller then transmits the identity of the line of the proper video or voice line in the selected terminal. The switching system then extends the call to the computer system or telephone station in the terminal.

A communication assistant at the terminal answers the call at the terminal. If the call is a voice call, the communication assistant asks for the number to call to establish a video conference or connection with a hearing or speech impaired user. If the call is a video call, the video assistant asks for a voice number to call. When the second call is connected, the calling assistant then relays messages by interpreting sign language via video to the hearing or speech impaired user and talking to the second user.

In order to provide this sign language telephone relay service, a call controller of the call center is configured in the following manner. The call controller is a processing unit that has a memory. A terminal database is maintained in the memory by the call controller. The terminal database is used to maintain the current status of each terminal in the call center. The processing unit executes performs the following functions. First, the call controller receives a request from the switching system for an identity of one of said plurality of terminals to handle an incoming call. The call controller then determines which one of the terminals is available to handle the incoming call. The call controller transmits the identity of the selected terminal to the switching system.

In order to determine the identity transmitted back to the switching system the call controller may perform the following functions. First, the call controller determines whether the incoming call is a video call or a voice call. If the call is a video call, the call controller selects an identity of a computer system in a terminal. The identity of the telephone line connected to the selected computer system is then transmitted to the switching system.

In order to maintain a terminal database of the availability of terminals to handle calls the call controller executes the following process. When a terminal is available to handle a call, the call controller receives a terminal available message from one of the terminals. The call controller then updates the terminal database to indicate that the terminal is available to handle calls. When a terminal is not available to receive a call, the call controller receives a terminal unavailable message from the terminal and updates the terminal database to indicate that the terminal is unavailable to handle calls.

As stated above each terminal has a computer system and a telephone station. The computer system executes software that handles video calls. The computer system also performs the following functions in each terminal of a call center providing this invention. When a voice or a video incoming call is connected to the termninal, the computer system generates a call establish message. When the incoming call is terminated, the computer system generates a call terminated message. The call established message may include an indication as to whether the incoming call is a voice call or a video call. The call established message may also indicate the, hearing and speech impaired user being serviced during the call.

The call center of this invention must also have a method of tracking all the calls handled for billing purposes. Therefore, the call center may include a call detail record server that maintains records of calls connected to each of the terminals. The call detail record server may be a separate processing unit connected to the network in the call center or may be software executed by the computer system in each terminal of the call center.

The call center may perform the following functions. The call detail record server receives a call established message from a terminal indicating that an incoming call is connected to the terminal. In response to receiving the call established message, the call detail record server generates a call detail record for the incoming call. When the incoming call is disconnected, the call detail server receives a call terminated message from the terminal and updates the call detail record to indicate the length of time for the incoming call. The call detail record may also indicate the hearing and speech impaired user receiving service for the incoming call, a calling party for the incoming call, and a called party for the incoming call.

The call center of this invention may include a switching system connected to each of the terminals, the call controller, and the public telephone network switching system network. The switching system performs the following functions to process an incoming call. The switching system receives a call set-up message for the incoming call. In response to receiving the call set-up message, the switching system transmits a request for an identity of a terminal that is to handle the incoming call to the call controller. The switching system receives an identity of the terminal to handle the incoming call from the call controller and extends the incoming call to the identified terminal.

When an incoming call is received, the switching system may determine whether the incoming call is a video call and transmits a request for a computer station in one of the terminals. In response to the request, the switching system may receive an identity of an available terminal including the identity of the computer system. The switching system then extends the incoming call to the computer system. When an incoming call is a voice call, the switching system receives an identity of the telephone station in the available terminal and extends the incoming call to the telephone station.

In order to provide, sign language relay service to hearing impaired user, the hearing impaired user must have a video terminal. A video terminal is a camera, and a computer system that executes software which allows video received by the camera to be transmitted to via a telephone call. The video terminal is connected either directly or through the public switching system network to the switching system of this invention. Since the cost of video terminals may be prohibitive, video terminals could be set-up in public areas in order that all of the hearing and speech impaired have access to this telephone service.

BRIEF DESCRIPTION OF THE DRAWINGS

FIG. 10 illustrates a process executed by a call detail server to provide records of each call handled by a terminal.

DETAILED DESCRIPTION

Figure 1:
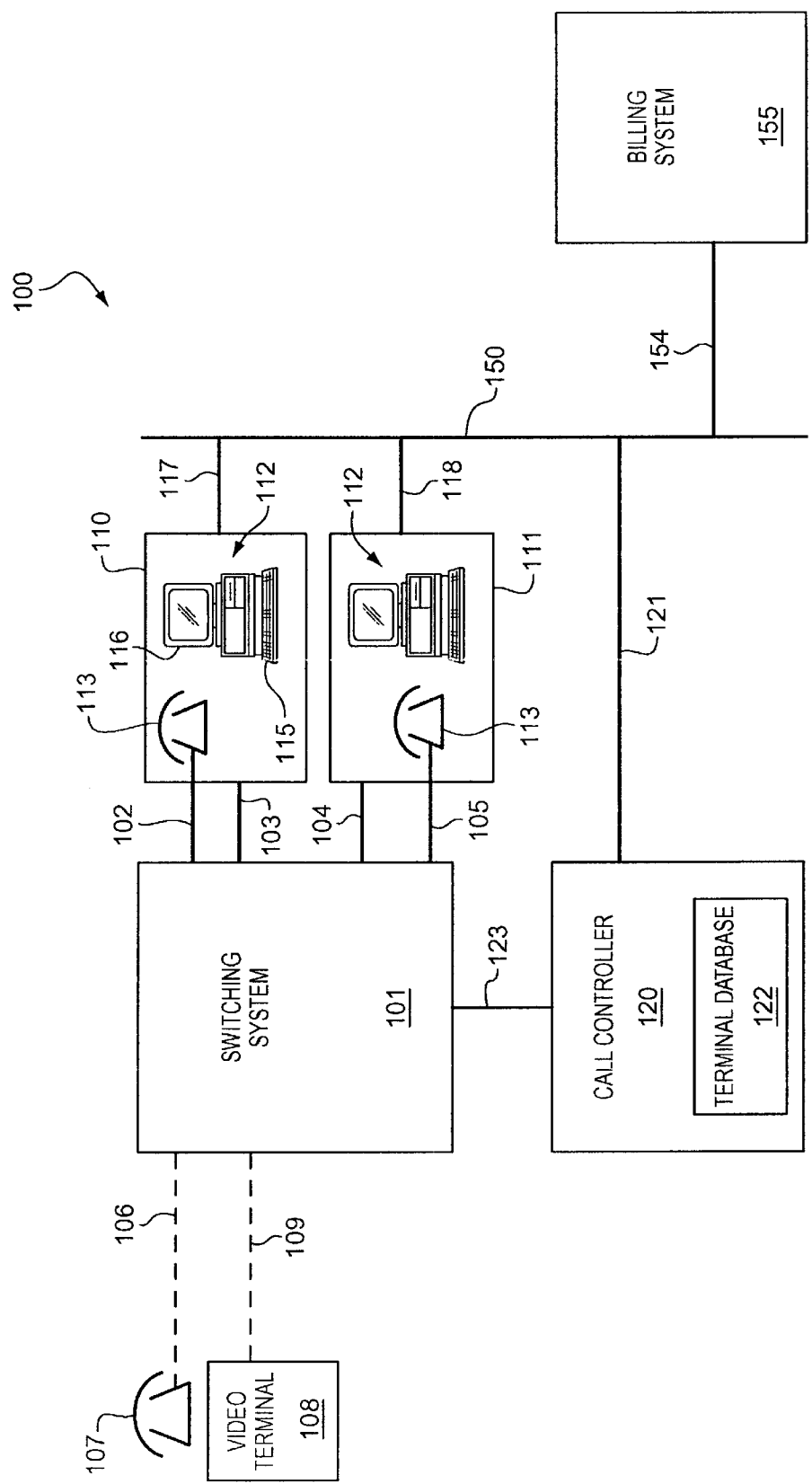
FIG. 1 illustrates call center in accordance with this invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

FIG. 1 illustrates the components of a call center that provides sign language relay to the hearing and speech impaired. One use for sign language relay is to allow the hearing and speech impaired to communicate using sign language over the telephone. A second use for sign language relay is remote interpretation of sign language. One skilled in the art will recognize that some components have been left out of call center 100 for clarity of an explanation of this invention. In call center 100, multiple terminals 110–111 are connected to a switching system 101. Only two terminals are shown for clarity. However, any number of terminal permitted by the connections to switching system 101 may be used.

Switching system 101 is a device that connects a calling party and a called party to provide telephone service. One such device is a telecommunication switch. An exemplary telecommunications switch that is used in conjunction with call centers is a Rockwell ACD switch. Video terminal 108 and telephone station 107 place calls to a telephone number of call center 100. The calls are routed to switching system 101 via paths 106 and 109. One skilled in the art will recognize that telephone station 107 and video terminal 108 may be directly connected to switching system 101 or connected via a public switching system network.

Each terminal 110–111 includes a telephone station 113 and a computer system 112. Telephone station 113 is a conventional telephone set such as a Plain Old Telephone Set (POTS) and is connected to switching system 101 via path 102,105. One example of path 102, 105 is conventional 2-wire connection between a POTS and a switch. Telephone station 113 may also be connected to computer system 112 to allow computer system 112 to detect an off-hook condition and a connection established.

Computer system 112 is a conventional computer system such as a typical personal computer made by any one of a number of manufacturers. Software executed by computer system 112 includes software that receives, displays, and transmits video data over a telephone call. Computer system 112 also includes a display 116 for displaying video images and an input device such as keyboard 115 to receive input from a user. Computer system 112 includes a modem or other such device for connecting to switching system 101 via path 103, 104. Computer system 112 has an Ethernet card or other such device to connect computer system 112 to network 150 via path 117, 118. Network 150 connects terminals 110–111, call controller 120 and billing system 155 to allow communication between the devices.

Call controller 120 determines which terminal 110–111 handles a call. A terminal database 122 may be maintained by call controller 120. The terminal database 122 maintains records of terminals available to handle calls. Call controller 120 communicates with switching system 101 via data link 123. Call controller 120 is also connected to network 150 via path 121.

Billing system 155 is connected to network 150 via path 154. Periodically, each terminal transmits records of all calls handled to billing system 155 via network 150. The records of calls are used by billing system 155 to charge customers for the service.

Figure 2:
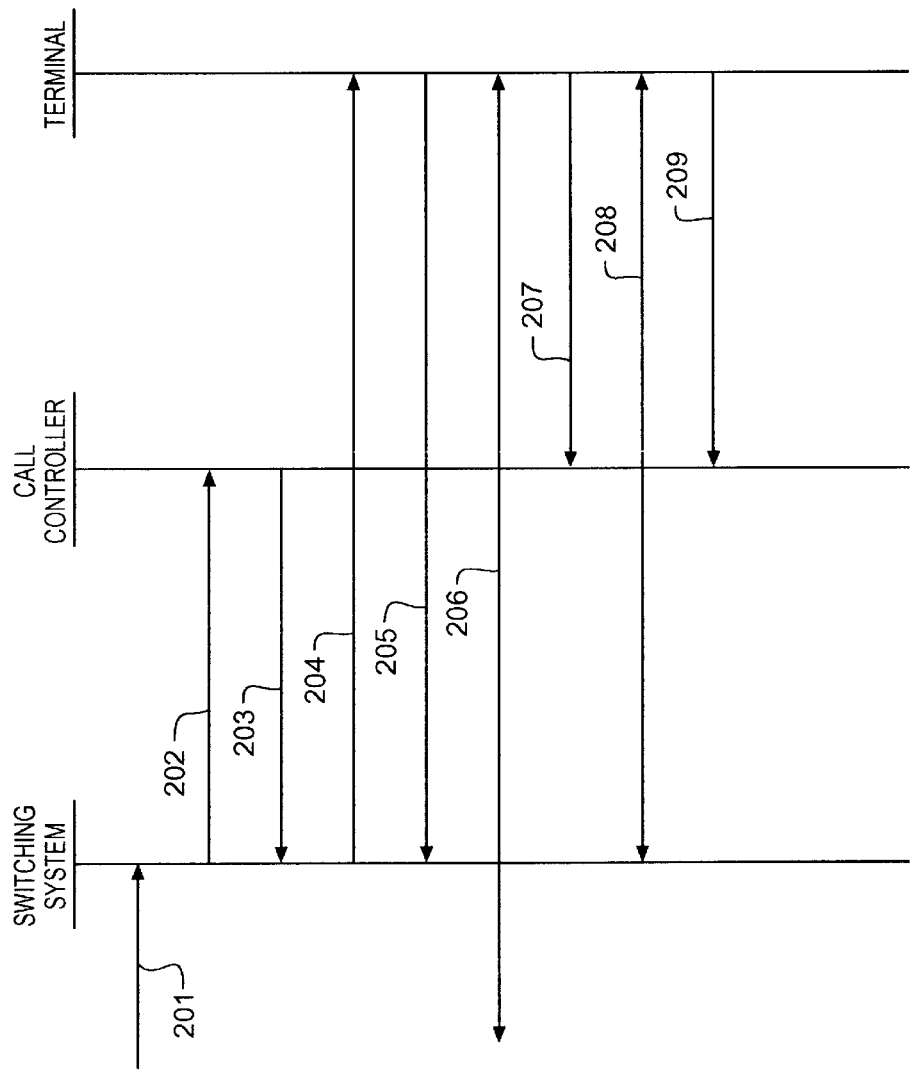
FIG. 2 illustrates a signaling chart for components of a call center to handle a call.

FIG. 2 illustrates a chart of messages transmitted between components of call center 100 illustrated in FIG. 1 to provide sign language telephone relay to the hearing and speech impaired. First, switching system 101 receives a call set-up message 201 for an incoming call from either a video terminal 108 or a telephone station 107. Switching system 101 transmits a request message 202 to call controller 120 for the identity of a terminal 110–111 available to handle the incoming call.

Call controller 120 selects an available terminal. A selected terminal message 203 is then transmitted to switching system 101. If the incoming call is a video call, the line connecting the computer system 112 in the available terminal 1100–111 to switching system 101 is identified in the selected terminal message 203. If the incoming call is a voice call, the line connecting telephone station 113 of the available terminal 110–111 to switching system 101 is identified in the selected terminal message 203.

In response to receiving the selected terminal message 203, switching system 101 extends ring message 204 to the identified terminal 110. If the incoming call is a video call, the ring message 204 is extended to computer system 112 in available terminal 110–111. If the incoming call is a voice call, the ring message 204 is extended to the telephone station 113 of the available terminal 110–111.

When the incoming call is connected to available terminal 110–111, an acknowledgment message 205 is transmitted from the available terminal 110–111 to the switching system 101. A call circuit 206 is then established between the calling party and the available terminal 110,111. In response to a call being connected, a terminal unavailable message 207 is transmitted from available terminal 110–111 to call controller 120. Call controller 120 updates terminal database 122 to indicate that the terminal 110–111 is unavailable.

The terminal 110–111 then receives a telephone number to call. For a voice call, the communication assistant at the terminal 110–111 receives a telephone number of the video terminal of a hearing and/or speech impaired user. For a video call, the telephone number for a voice line of a second party is received. The terminal 110–111 then uses switching system 101 to establish a second outgoing telephone call. The communication assistant then relays messages 208 using sign language to communicate with the hearing or speech and talking to the second party over a voice call.

When the call ends, terminal 110–111 transmits a terminal available message 209 to call controller 120. The terminal database 122 is then updated to indicate that the terminal is available to handle another incoming call. Terminal 110–111 may also generate a call detail record of the call. The call detail record may include the hearing and speech impaired user that is provided service by the call, the time of the call, date of the call, duration, and the second party.

The call detail record is stored in a memory in the computer system 112 of the terminal 110–111. Periodically, each of the terminals 110–111 transmits all of the stored call detail records to CDR Server. The CDR Server periodically transmits the call detail record to billing system 155. Billing system 155 may then use the information in the call detail records to generate information about users of the service and to charge for the service.

The following is an exemplary embodiment of a call center that includes this invention to provide sign language call relay to the hearing and speech impaired. It should be apparent to those skilled in the art that the various features and functions of described in the embodiment below may be combined in many different configurations and is not limited to the configuration described below.

Figure 3:
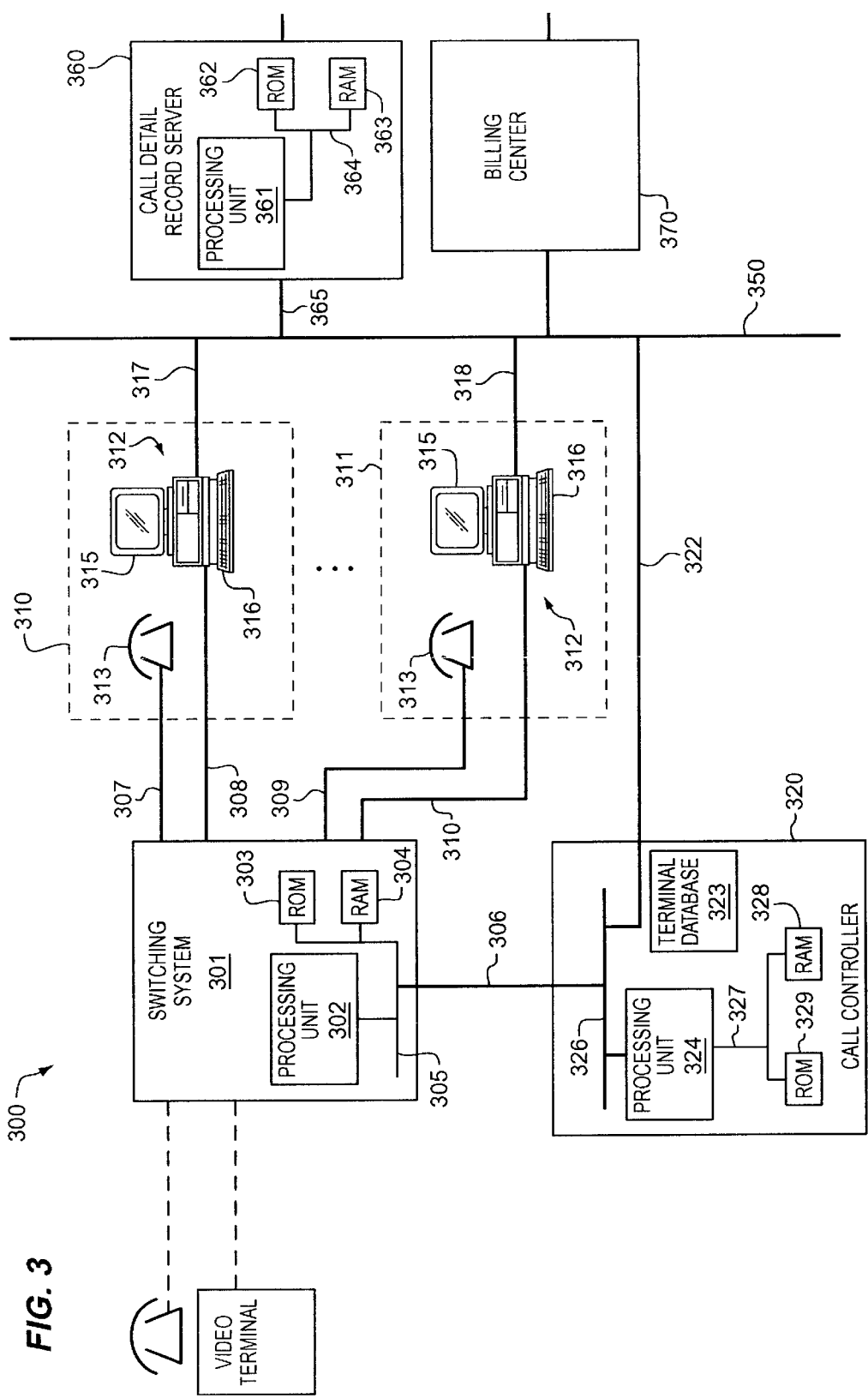
FIG. 3 illustrates a preferred exemplary embodiment of the call center of this invention.

FIG. 3 illustrates an exemplary embodiment of a call center 300 that provides sign language call relay to hearing and/or speech impaired users. Call center 300 includes a plurality of terminals 310–311 and a call controller 320 connected to a switching system 301. The call center 300 may also include the switching system 301 and a Call Detail record (CDR) server 360.

Switching system 301 is a device that extends telephone calls to end devices in each of terminals 310–311. One common switching system is a conventional switch used in telephone networks. One type of switch commonly used in conjunction with call centers is a Rockwell ACD switch. Switching system 301 includes a controller.

The controller is a processing unit 302. For purposes of this application, a processing unit is a processor, microprocessor, or a group of processors that execute instructions stored in a memory to perform a function. Processing unit 302 is connected to a non-volatile memory such as Read Only Memory (ROM) 303 via bus 305. Non-volatile memory stores instructions needed to perform the basic functions that the processing unit needs for performing more complex functions. A volatile memory, such as Random Access Memory 304, may also be connected to processing unit 302 via bus 305. The volatile memory stores the instructions and data needed by processing unit 302 to perform a function. Processing unit 302 may communicate with a processing unit in call controller 320 via a data link 306. Data link 306 is a conventional data link that connects call controller 320 and switching system 301.

Each terminal 310–311 includes a computer system 312 and a telephone station 313. The computer system 312 is a conventional computer system such as a personal computer manufactured by any one of a number of manufacturers. The computer system 312 includes a display 315 such as a monitor and an input device 316 such as a keyboard. Software executed by the computer system 312 converts data received over a video telephone call to images that are displayed upon display 315. The software executed may be able to support more than one type of protocol for data transmitted over the video call.

Computer system 312 is connected to network 350 within call center 300. Network 350 may be a conventional Ethernet network and computer system 312 may include an Ethernet "card" to allow computer system 312 to be connected to network 350. Computer system 312 is also connected to switching system 301 via path 308, 310. One manner of connecting computer system 312 to path 308, 310 is a modem in computer system 312.

Telephone station 313 is connected to switching system 301 via path 307, 309. Telephone station 313 may be a conventional telephone set. Path 307, 309 may be a conventional 2-wire connection. Computer system 312 may also be connected to telephone station 313. The connection of computer system 312 to telephone station 313 allows computer system 312 to detect when telephone station 313 receives a call and places a call.

Call controller 320 is connected to network 350 via path 322 and to switching system 301 via data link 306. Call controller 320 communicates with terminals 310–311 via network 350 in order to maintain a terminal database 323. The terminal database 323 is used to select a terminal to handle an incoming call.

Call controller 320 includes a processing unit 324 that executes instructions for providing the functions of call controller 320. A non-volatile memory, such ROM 329, may be connected to processing unit 324 via memory bus 327. The non-volatile memory stores instructions needed to operate the system of call controller 320. A non-volatile memory, such as RAM 328, is also connected to processing unit 324 via memory bus 327. Non-volatile memory stores the instructions and data needed to perform the functions of call controller 320.

Bus 326 connects processing unit 324 to other devices. One device that may be connected to processing unit 324 via bus 326 is data link 306. Bus 326 also connects processing unit 324 to path 322.

Call center 300 may also include a Call Detail Record (CDR) server 360. CDR server generates and maintains records of each call handled by each terminal 310–311 handled by call center 300. One skilled in the art will recognize that CDR server 360 may be a separate processing unit, may be software executed on the computer system 312 of each terminal 310–311, or on the same processing unit 324 of call controller 320. CDR server 360 includes a processing unit 361. Processing unit 361 has a non-volatile memory, such ROM 362, and a volatile memory, such as RAM 363, connected via memory bus 364. Processing unit 361 may also be connected to network 350 via path 365. Messages indicating the connection and the termination of a call from terminals 310–311 are received by CDR server 360 via path 365.

Network 350 also may connect to a billing system 370. The billing system 370 receives the call detail records from the CDR server 360 for billing purposes. The billing system 370 is conventional and description is omitted for brevity of the document.

Figure 4:
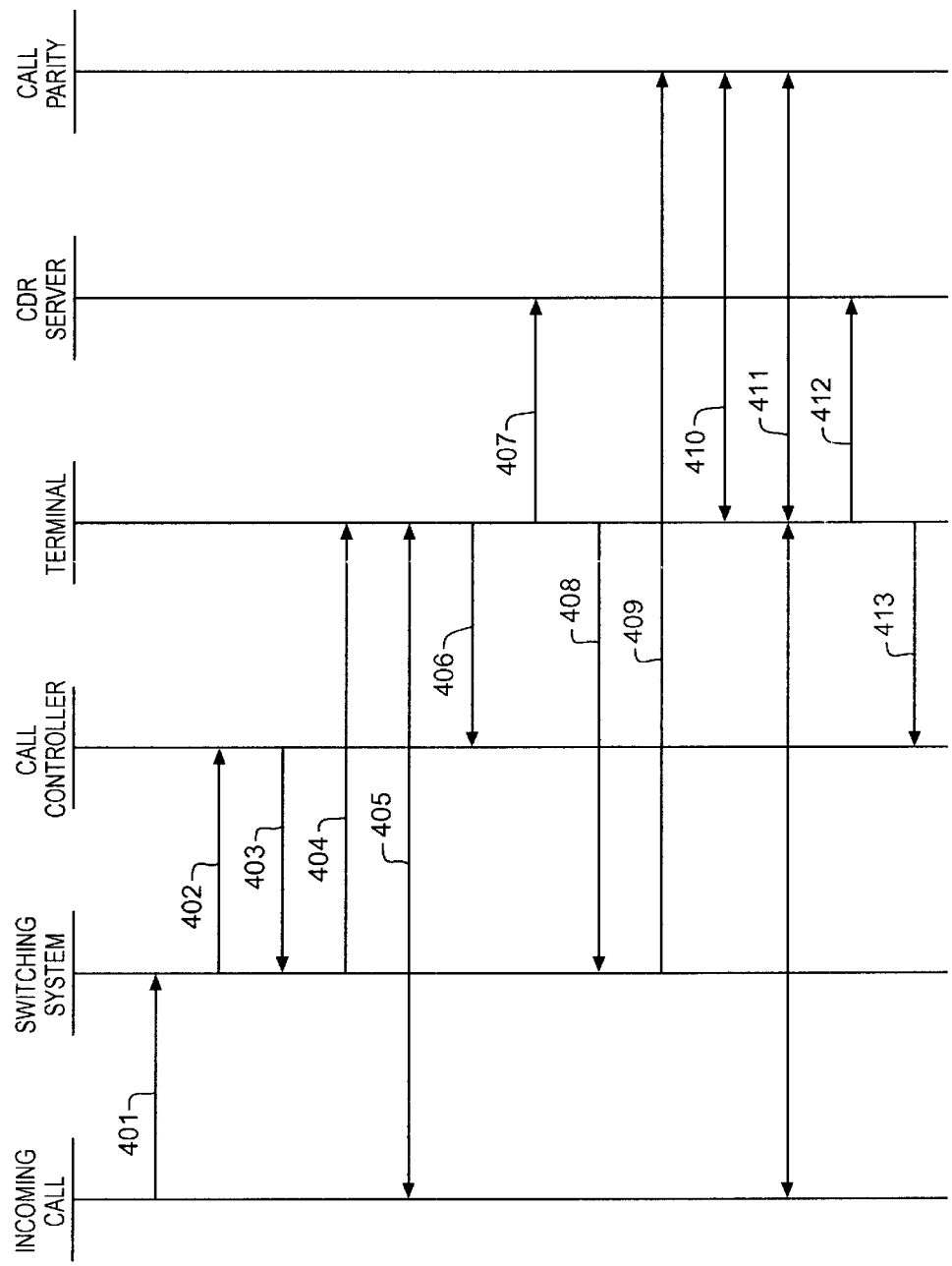
FIG. 4 illustrates a signaling chart for handling a call in the preferred exemplary embodiment of this invention.

FIG. 4 illustrates the messages transmitted between the components of call center 300 (FIG. 3) to provide sign language relay for telephone calls to the speech and hearing impaired. First, a call set-up message 401 is received by switching system 301. In response to receiving call set-up message 401, switching system 301 transmits a request message 402 to call controller 320 for an available terminal 310–311 to handle the incoming call. The switching system 301 may first determine whether the incoming call is a video or a voice call. Then the switching system 301 may include a request for a voice or a video line into the available terminal 310–311 in the request message 402.

In response to receiving the request message 402, the call controller 320 selects an available terminal 310–311 to handle the incoming call. The call controller 320 may then determine whether the incoming call is a video call or a voice call. If the incoming call is a video call, the call controller 320 may then transmit an identity of the computer system 312 in the selected available terminal 310–311. If the incoming call is a voice call, the call controller 320 may then transmit the identity of the telephone station 313 in the selected available terminal 310–311. The call controller 320 then responds to switching system 301 by transmitting a selected terminal message 403 with an identity of the selected terminal 310–311.

After receiving the selected terminal message 403, switching system 301 transmits ring 404 to the selected terminal 310–311. When the call is answered, circuit complete message 405 is transmitted to the origination point of the incoming call. The selected terminal 310–311 then transmits a terminal unavailable message 406 to call controller 320. The terminal database 323 is then updated by call controller 320 to indicate that the terminal is unavailable to handle a call.

The selected terminal 310–311 also transmits a call connected message 407 to CDR server 360. The call connected message 407 may include time of day of connection, hearing or speech impaired person being serviced, the calling party and the called party. CDR server 360 uses the information in the call connected message 407 to generate a call detail record for the incoming call.

The terminal 310–311 then receives a telephone number of a party to call for a second call. The second call is a voice call if the incoming call is a video call. If the incoming call is a voice call, the second call may be a video call. The terminal 310–311 then transmits a request 408 for the second call to the switching system 301.

Switching system 301 transmits a call set-up message 409 to the called party. When a called party answers the call, call 410 is set-up between the selected terminal 310–311 and the called party. Messages 411 are then relayed between the called party and the calling party using sign language over the video call and spoken language over the voice call.

When the call is ended, terminal 310–311 transmits a connection ended message 412 to CDR server 360. The connection ended message 412 may include the time of day the connection ended, duration of the call, and other information needed for billing purposes. The CDR server 360 then updates the call detail record for the call.

When the call is ended, the terminal 310–311 also transmits a terminal available message 413 to the call controller 320. The terminal database 323 is then updated by call controller 320 to indicate that terminal 310–311 is available to handle calls.

Figure 5:
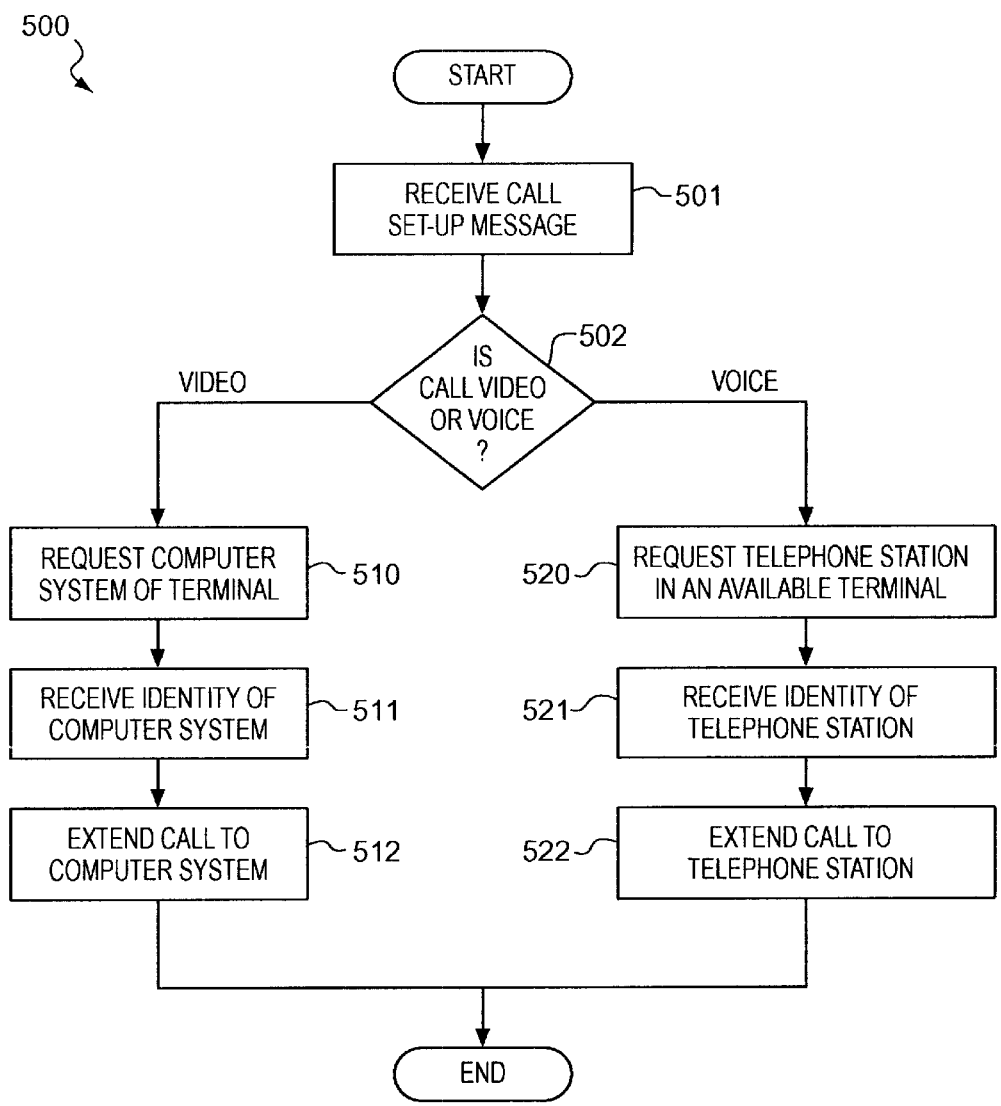
FIG. 5 illustrates a flow diagram of a process performed by a switching system to handle a call in the preferred exemplary embodiment.

FIG. 5 illustrates a process 500 executed by switching system 301 in an exemplary embodiment to complete an incoming call to call center 300. Process 500 begins in step 501 with a call set-up message being received by switching system 301. In step 502, switching system 301 determines whether the incoming call is a video call or a voice.

If the incoming call is a video call, a request for a computer system in a terminal is transmitted to call controller 320 in step 510. The switching system 301 then receives the identity of the line connected to the computer system 312 of a selected available terminal 310–311 in step 511. The call is then extended to the identified computer system 312 in the step 512 and process 500 ends.

If the incoming call is a voice call, the switching system 301 transmits a request message for an identity of a line connected to a telephone station 313 in an available terminal 310–311 in step 520. In step 521, switching system 301 receives a selected terminal message including the identity of the telephone line connected to the telephone station 313 in the selected terminal 310–311. The incoming call is then extended to the telephone station 313 in the selected terminal 310–311 in step 522 and process 500 ends.

Figure 6:
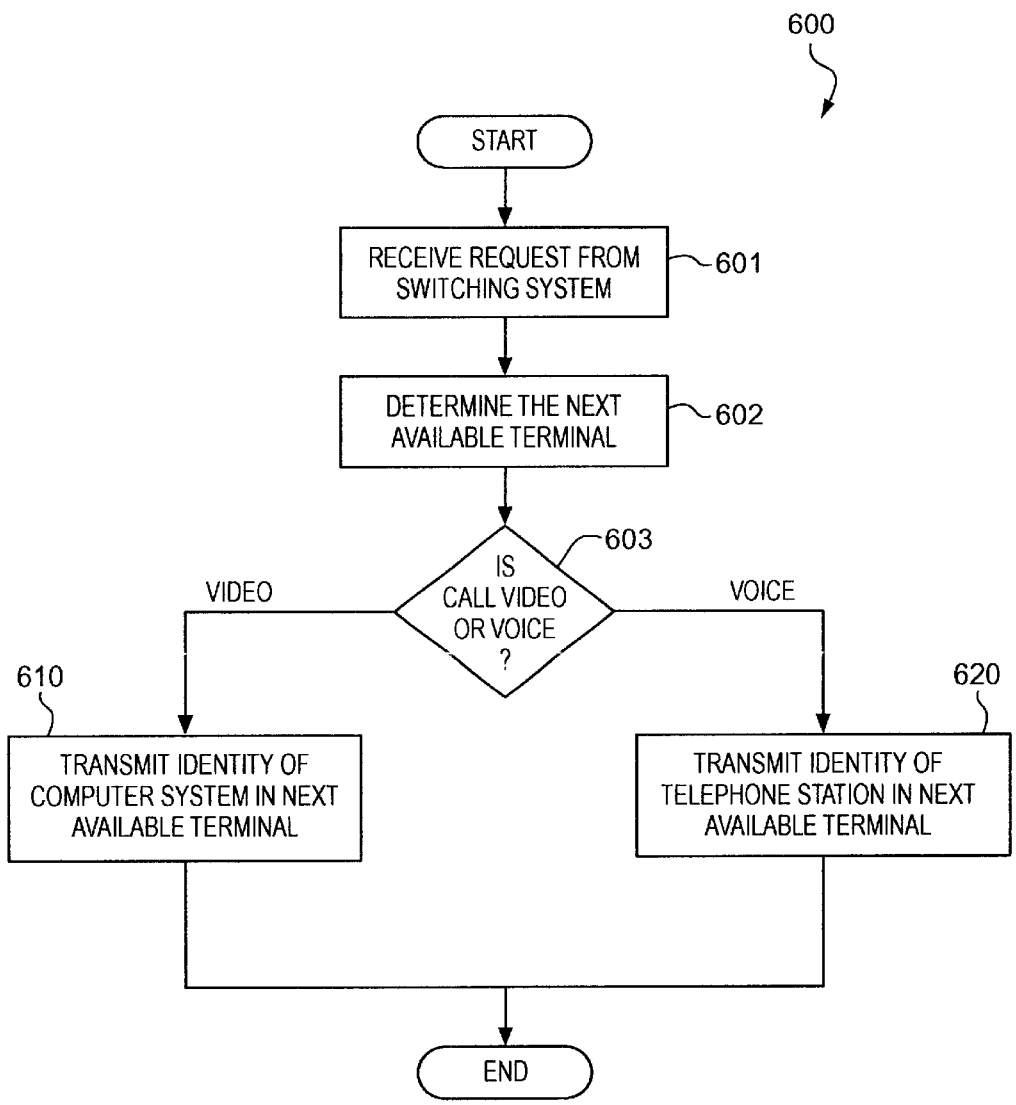
FIG. 6 illustrates a flow diagram of a process executed by a call controller to handle a call in the preferred exemplary embodiment.

FIG. 6 illustrates a process 600 performed by call controller 320 to handle an incoming call. Process 600 begins in step 601 when a request message is received from switching system 301. In step 602, call controller 320 selects which available termninal 310–311 handles the incoming call. In step 603, call controller 320 may determine whether the incoming call is a video call or a voice call. If the incoming call is a video call, the call controller 320 generates and transmits a selected terminal message including an identity of the line connected to the computer system 312 in the selected terminal 310–311 in step 610 and process 600 ends. If the incoming call is a voice call, call controller 320 generates and transmits a selected terminal message including the identity of the telephone line connected to telephone system 313 in the selected terminal 310–311 in step 620 and process 600 ends.

Figure 7:
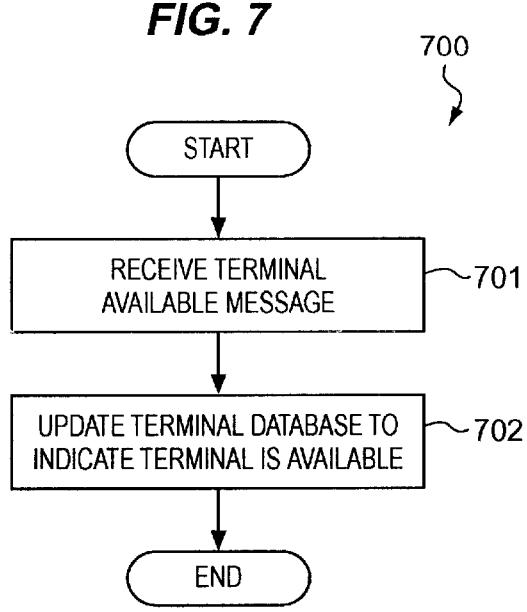
FIG. 7 illustrates a flow diagram of a process executed by a call controller to update a terminal database responsive to receiving a terminal available message in the preferred exemplary embodiment.
Figure 8:
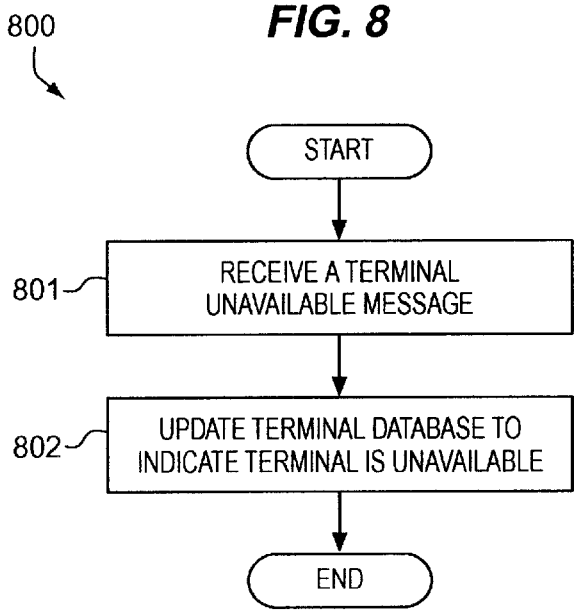
FIG. 8 illustrates a process executed by a call controller for updating a terminal database responsive to receiving a terminal unavailable message in the preferred exemplary embodiment.

In order to select an available terminal to handle a call, call controller 320 must maintain a terminal database 323 that indicates the terminals 310–311 available to handle calls. FIGS. 7 and 8 illustrate processes for updating the terminal database 323. Process 700 illustrated in FIG. 7 updates the terminal database 323 when a terminal 310–311 becomes available to handle calls. Process 700 begins in step 701 with call controller 320 receiving a terminal available message from a terminal 310–311. The terminal 310–311 may transmit a terminal available message responsive to completing a call and when a communication assistant logs-in to the terminal. In step 702, call controller 320 updates the terminal database 323 to indicate that the terminal 310–311 is available to handle calls and process 700 ends.

Process 800 illustrated in FIG. 8 is the process for indicating that a terminal is not available to handle calls. Process 800 begins with call controller 320 receiving a terminal unavailable message from a terminal 310–311. Terminals 310–311 may transmit terminal unavailable messages when a user logs-out, when a software error occurs, or when a call is received. In response to receiving the terminal unavailable message, call controller 320 updates the terminal database 323 to indicate that the terminal 310–311 is unavailable and process 800 ends.

Figure 9:
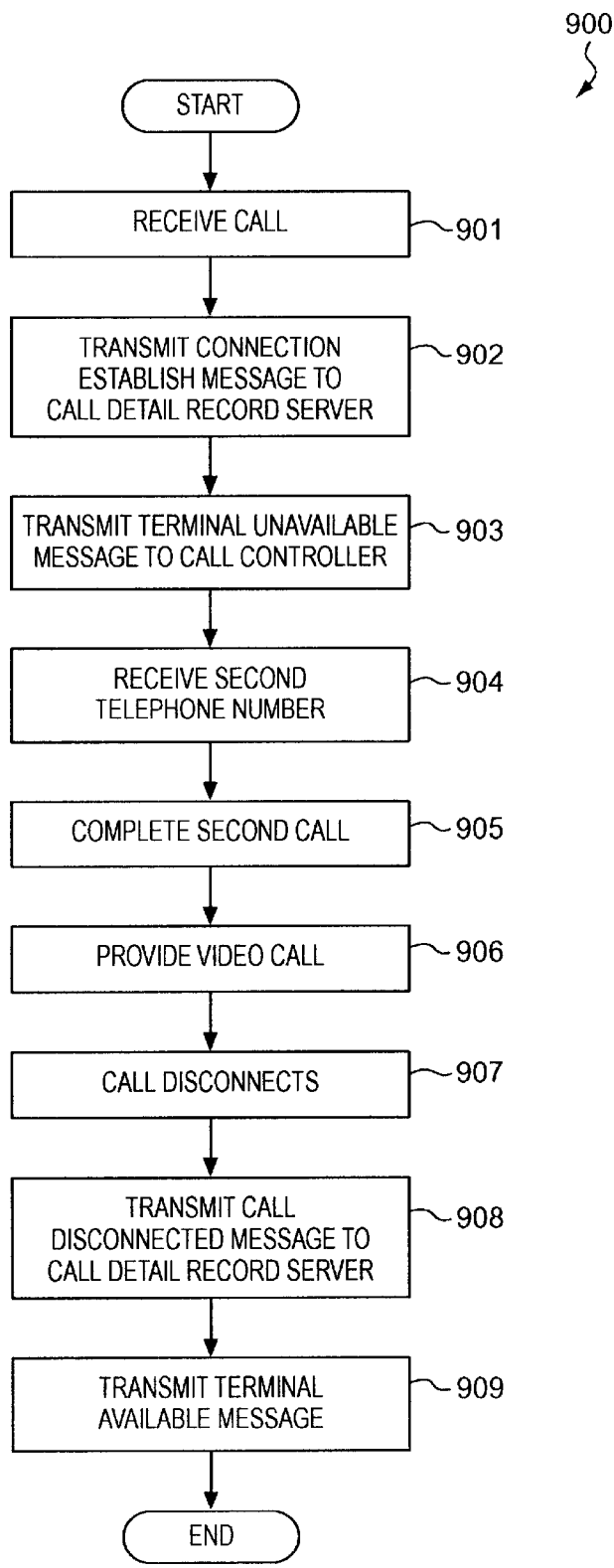
FIG. 9 illustrates a process executed by a terminal to handle a call.

FIG. 9 illustrates a process 900 performed by a computer system 312 in a terminal 310–311 when a call is received by terminal 310–311. Process 900 begins in 901 with terminal 310–311 receiving a call. If the call is a video call, the computer system 312 may determine the protocol being used to transmit data from a video terminal and begins executing software to communicate using the protocol of the video terminal. If the call is a voice call, the computer system 312 senses an off-hook condition in the telephone station 313.

In response to receiving a call, computer system 312 transmits a connection established message to CDR server 360 in step 902. The connection established message may include the telephone number of the calling party, a video or voice designation, and a time of day the connection was established. In step 903, the computer system also transmits a terminal unavailable message to call controller 320.

The communication assistant then requests a telephone number of a second party. In step 904, the communication assistant receives the telephone number of the second party. The communication assistant then either uses the telephone station 313 to dial the telephone number of the second party or enter the number into the computer system 312 of the terminal 310–311. In step 905, the second call is completed. In step 906, computer system 312 provides video data between a video terminal of a hearing and speech impaired user and communication assistant by computer as messages are relayed between a calling party and a called party.

The call disconnects in step 907. In response to the call being disconnected, the computer system 312 transmits a call disconnected message to the CDR server 360 in step 908. The call disconnected message may include the calling party, the called party, the hearing and/or speech impaired user serviced, and time the call is disconnected. A terminal available message is also transmitted to call controller 320 in step 909 and process 900 ends.

Process 1000 illustrated in FIG. 10 is a process performed by CDR server 360 to generate call detail records for each call handled by terminals 310–311 in call center 300. Process 1000 begins in step 1001 with CDR server 360 receiving a connection established message. In response to receiving a connection established message, a call detail record is generated in step 1002. The call detail record may include the time of the connection, the calling party and the terminal 310–311 handling the call. This information may be read from the connection established message.

After a call is disconnected, the CDR server 360 receives a call disconnected message from the terminal 310–311 in step 1003. The call disconnected message may include the called party, the calling party, the identification of the hearing and/or speech impaired user being serviced by the call, and the time the call is disconnected. In step 1004, CDR server 360 updates the call detail record. The update may include entries that indicate the called party, the calling party, the identification of the hearing and/or speech impaired user being serviced by the call, the time the call is disconnected, and the duration of the call. After the call detail record is updated, the call detail record is stored in memory in step 1005 and process 1000 ends. The call detail record is stored in a memory until the record is eventually transmitted to a billing system 370.

The above-described steps in the processes of the embodiments of this invention can be comprised of instructions that are stored on storage media. The instructions can be retrieved and executed by a processing unit. Some examples of instructions are software, program code, and firmware. Some examples of storage media are memory devices, tape, disks, integrated circuits, and servers. The instructions are operational when executed by the processing unit to direct the processing unit to operate in accord with the invention. Those skilled in the art are familiar with instructions, processor, and storage media. Those skilled in the art will appreciate variations of the above-described embodiments that fall within the scope of the invention. As a result, the invention is not limited to the specific examples and illustrations discussed above, but only by the following claims and their equivalents.

We claim:

1. A communication method comprising:
   in a switching system, receiving a call setup message for an incoming call for an audio impaired user;
   in the switching system, processing the call setup message to generate and transmit a request message to a call controller to request one of a plurality of operator terminals to handle the incoming call for the audio impaired user;

receiving the incoming call into the switching system;

determining whether the incoming call is a video call from the audio impaired user or a voice call to the audio impaired user;

in the call controller, processing the request message to select the one of the plurality of the operator terminals based on the determination of whether the incoming call is the video call or the voice call;

in the call controller, generating and transmitting a selected message indicating the selected one of the plurality of the operator terminals; and in the switching system, extending the incoming call to the selected one of the plurality of the operator terminals based on the selected message.

2. The communication method of claim 1 wherein determining whether the incoming call is the video call or the voice call is in the switching system.

3. The communication method of claim 1 wherein determining whether the incoming call is the video call or the voice call is in the call controller.

4. The communication method of claim 1 further comprising:

in the call controller, receiving a terminal message indicating availability of the one of the plurality of operator terminals; and updating a terminal database based on the terminal message.

5. The communication method of claim 1 further comprising:

receiving a connection established message from the one of the plurality of operator terminals into a call detail record server; and generating a call detail record for the incoming call.

6. The communication method of claim 5 further comprising:

receiving a call disconnected message from the one of the plurality of operator terminals; and updating the call detail record based on the call disconnected message.

7. The communication method of claim 1 wherein processing the request message to select the one of the plurality of the operator terminals comprises selecting a computer system in the one of the plurality of operator terminals when the incoming call is the video call.

8. The communication method of claim 1 wherein processing the request message to select the one of the plurality of the operator terminals comprises selecting a telephone station in the one of the plurality of operator terminals when the incoming call is the voice call.

9. The communication method of claim 1 further comprising;

receiving a second message into the switching system wherein the second message indicates a destination for the incoming call; and extending the incoming call based on the second message.

10. A communication system comprising:

a switching system configured to receive a call setup message for an incoming call for an audio impaired user, process the call setup message to generate and transmit a request message to request one of a plurality of operator terminals to handle the incoming call for the audio impaired user, receive the incoming call, determine whether the incoming call is a video call from the audio impaired user or a voice call to the audio impaired user, and extend the incoming call to the selected one of the plurality of the operator terminals based on a selected message; and a call controller connected to the switching system and configured to process the request message to select the one of the plurality of the operator terminals based on the determination of whether the incoming call is the video call or the voice call and generate and transmit the selected message indicating the selected one of the plurality of the operator terminals.

11. The communication system of claim 10 wherein the call controller is configured to receive a terminal message indicating availability of the one of the plurality of operator terminals and update a terminal database based on the terminal message.

12. The communication system of claim 10 further comprising a call detail record server configured to receive a connection established message from the one of the plurality of operator terminals and generate a call detail record for the incoming call.

13. The communication system of claim 12 wherein the call detail record server is further configured to receive a call disconnected message from the one of the plurality of operator terminals and update the call detail record based on the call disconnected message.

14. The communication system of claim 10 wherein the call controller is configured to select a computer system in the one of the plurality of operator terminals when the incoming call is the video call.

15. The communication system of claim 10 wherein the call controller is configured to select a telephone station in the one of the plurality of operator terminals when the incoming call is the voice call.

16. The communication system of claim 10 wherein the switching system is further configured to receive a second message into the switching system wherein the second message indicates a destination for the incoming call and extend the incoming call based on the second message.

17. A communication system comprising:

a switching system configured to receive a call setup message for an incoming call for an audio impaired user, process the call setup message to generate and transmit a request message to request one of a plurality of operator terminals to handle the incoming call for the audio impaired user, receive the incoming call, and extend the incoming call to the selected one of the plurality of the operator terminals based on a selected message; and the call controller connected to the switching system and configured to determine whether the incoming call is a video call from the audio impaired user or a voice call to the audio impaired user, process the request message to select the one of the plurality of the operator terminals based on the determination of whether the incoming call is the video call or the voice call and generate and transmit the selected message indicating the selected one of the plurality of the operator terminals.

18. The communication system of claim 17 wherein the call controller is configured to receive a terminal message indicating availability of the one of the plurality of operator terminals and update a terminal database based on the terminal message.

19. The communication system of claim 17 further comprising a call detail record server configured to receive a connection established message from the one of the plurality of operator terminals and generate a call detail record for the incoming call.

20. The communication system of claim 19 wherein the call detail record server is further configured to receive a call disconnected message from the one of the plurality of operator terminal and update the call detailed record base on the call disconnected message.

21. The communication system of claim 17 wherein the call controller is configured to select a computer system in the one of the plurality of operator terminals when the incoming call is the video call.

22. The communication system of claim 17 wherein the call controller is configured to select a telephone station in the one of plurality of operator terminals when the incoming call is the voice call.

23. The communication system of claim 17 wherein the switching system is further configured to receive a second message into the switching system wherein the second message indicated a destination for the incoming call and extended the incoming call based on the second.

* * * * *